United States Patent [19]

Tisma

[11] Patent Number: 5,351,811
[45] Date of Patent: Oct. 4, 1994

[54] SERPENTINE CONVEYORS ESPECIALLY FOR AUTOMATIC PACKAGING MACHINE

[75] Inventor: Stevan Tisma, Elk Grove Village, Ill.

[73] Assignee: Tisma Machinery Corp., Elk Grove, Ill.

[21] Appl. No.: 968,580

[22] Filed: Oct. 29, 1992

[51] Int. Cl.⁵ ............................................. B65G 39/20
[52] U.S. Cl. .................................. 198/845; 198/793; 198/851
[58] Field of Search .............. 198/793, 838, 845, 851

[56] References Cited

U.S. PATENT DOCUMENTS

| 2,830,712 | 4/1958 | Sykokis | 198/468.2 |
| 4,293,067 | 10/1981 | Anderson | 198/793 |
| 5,144,790 | 9/1992 | Tisma | 198/793 |
| 5,247,778 | 9/1993 | Tisma | 198/793 |

FOREIGN PATENT DOCUMENTS 86631  6/1936  Sweden ........................ 198/845

Primary Examiner—Joseph E. Valenza
Attorney, Agent, or Firm—Laff, Whitesel, Conte & Saret

[57] ABSTRACT

A link chain conveyor has rollers on opposite sides of the chain, a track has a groove in which the rollers travel, in both the vertical or the horizontal orientation. The link chain has a U-shaped bracket which is pivotally connected at each of its ends to a conventional link chain adapted to receive a tooth of a sprocket wheel. The U-shaped bracket has conventional link chain connector means so that almost any existing link claim carried equipment may be connected thereto. This way, the inventive claim is compatible with existing link chain conveyor equipment.

4 Claims, 4 Drawing Sheets

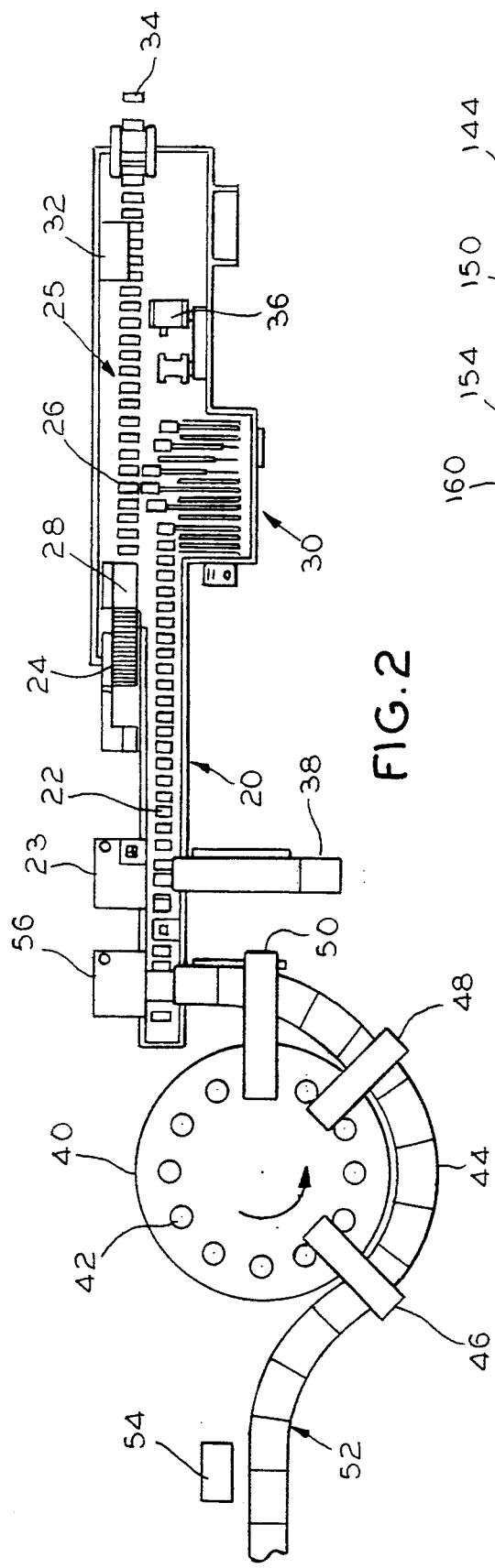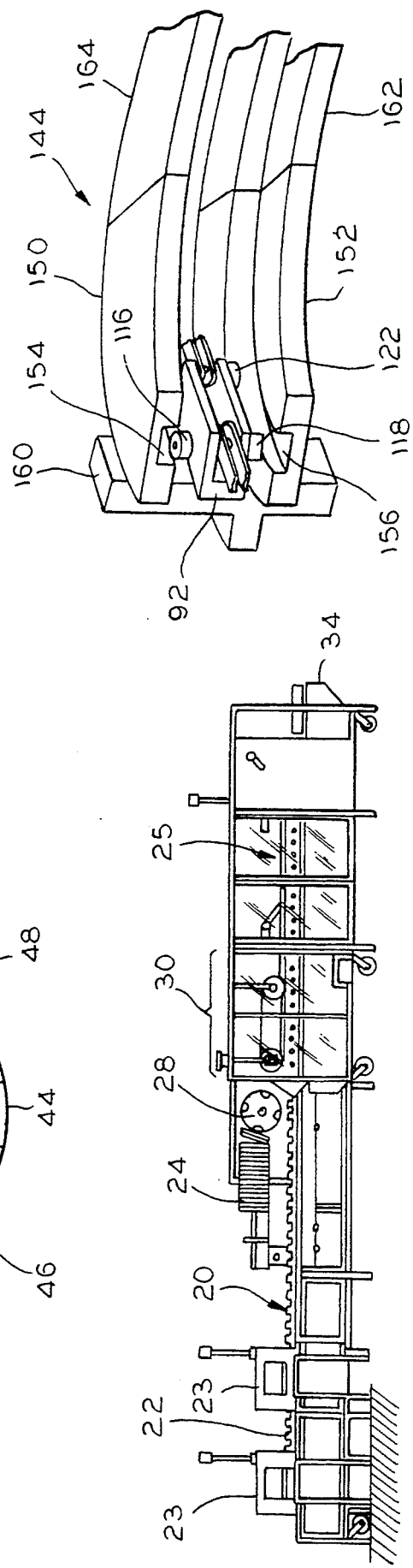

SERPENTINE CONVEYORS ESPECIALLY FOR AUTOMATIC PACKAGING MACHINE

This invention relates to conveyors especially—but not exclusively—for automatic packaging machines and more particularly to conveyors which may follow almost any convenient path, hereinafter called a "serpentine path".

Reference is made to the following U.S. patents for examples of automatic packaging machines, and parts therefor:

| | | |
|---|---|---|
| 4,491,267 | 4,738,081 | 5,010,929 |
| 4,548,593 | 4,745,732 | 5,058,634 |
| 4,578,929 | 4,829,751 | 5,072,573 |
| 4,713,928 | 4,856,566 | 5,144,790 |
| 4,716,714 | 4,982,556 | |

These automatic packaging machines have conveyors for moving mandrels or other devices (such as delivery spouts, for example) along a predetermined path. As the mandrels, etc. move, various things happen at work stations located along the conveyor. For example, cardboard blanks are picked up and formed into boxes, product is placed in the boxes, the boxes are weighed, sealed, and delivered to a suitable output or product collecting device. Of course, many other functions may also be performed by the automatic packaging machines.

Conventionally, the conveyor is a link chain having a plurality of mandrels (or the like) attached to it. The mandrels on one link chain conveyor may pick up the boxes, and present them to fill spouts on another link chain conveyor, which means that two conveyors must be synchronously driven. These link chains inherently require the mandrels, fill spouts, etc. to follow straight line paths, at least as they go by work stations in the packaging machines. Usually, such a straight line is preferred.

However, there are times when straight lines are not the most efficient way to carry the mandrels, fill spouts, etc. required to package products. For example, a factory floor may have previously dedicated, but not aligned, spaces already filled with various machines which should be visited in sequence by the conveyor. Perhaps the mandrel might have to visit and pick up product from each of these machines. Accordingly, there is a need for any automatic packaging machine conveyor which can be directed in almost any convenient direction without necessarily requiring any need for a straight line or any other predetermined path conveyors.

Another consideration relates to modules which are used on or in connection with the conveyors. These modules may be either general purpose devices or dedicated devices which are especially adapted to special needs. For example, some mandrels may be in the general nature of a bucket to carry anything that may be dropped into them. Other mandrels may be so specialized that they are dedicated to carry only golf balls or infant cereal, or another unique product, for example. Any new conveyor should be able to use these existing or any similar modules.

Accordingly, an object of this invention is to provide new and improved conveyors of the described type. Here, an object is to provide a conveyor which can follow virtually any convenient path. In this connection, an object of the invention is to provide a conveyor which is assembled from standard segments in order to form virtually any useful track configuration.

Another object of the invention is to provide automatic packaging machines having conveyors for accomplishing these goals without obsoleting existing equipment. Quite the contrary, an object is to be able to use virtually all existing modules on new and improved conveyors.

In keeping with an aspect of this invention, these and other objects are accomplished by a roller guided, link chain carrying periodically spaced rollers on the top and bottom (or each side) of the chain. The rollers move through special tracks which are able to guide and direct the rollers. The tracks may be mounted in either a horizontal or a vertical configuration. Therefore, a plurality of straight or curved track sections may be assembled in almost any desired manner to provide a conveyor having a desired path configuration. The roller guided, link chain has suitable connection points which conform to the connection points on a conventional link chain, so that standard modules may be connected thereto.

A preferred embodiment of this serpentine conveyor is shown in the attached drawings, wherein:

FIG. 1 is a side elevation of a conventional automatic packaging machine;

FIG. 2 is a top plan view of the automatic packaging machine of FIG. 1, modified to show a use of the inventive serpentine conveyor;

FIG. 7 is a perspective exploded view of a track for use with the inventive roller guided link chain.

Figure 3:
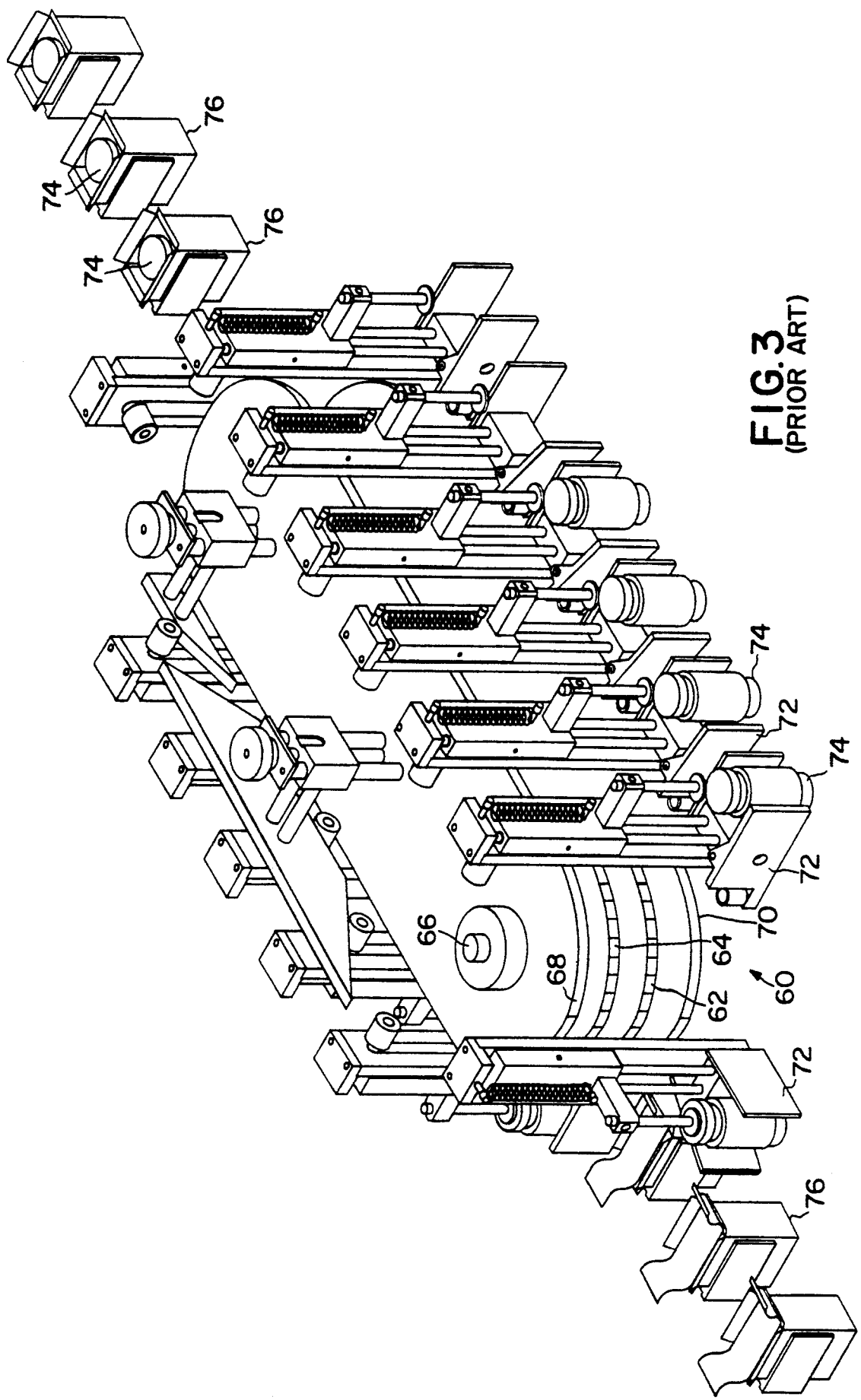
FIG. 3 is a perspective view of a conventional packaging machine conveyor having vertically oriented modules bolted to horizontal link chain conveyors.

A conventional automatic packaging machine is seen in FIG. 1, which is the kind of device that is shown and described in many of the above described patents, especially U.S. Pat. No. 4,578,929.

Briefly, a packaging machine of this type (FIGS. 1, 2) has a first link chain conveyor 20 which carries a plurality of mandrels (one of which is numbered 22). Product is placed in each mandrel at work stations 23, 23. A magazine 24 filled with cardboard blanks is positioned over a second link chain conveyor 25 that carries second mandrels, one of which is numbered 26. A rotary vacuum pick-up feeder 28 picks up the cardboard blanks one at a time from a magazine 24 and places them into individually associated mandrels 26, forming them into boxes in the process. At a location 30, pushers push the product from mandrels 22 on conveyor 20 and into boxes in mandrels 25. At 32, the boxes are sealed shut. At 34, the sealed boxes are discharged from the automatic packaging machine. A motor 36 drives the two conveyors 20, 25 which are linked to move in synchronism so that the pushers 30 will operate when they, the products in mandrels 22, and boxes in mandrels 26 are in substantially perfect alignment.

The conveyors 20, 25 are link chains, which are trained over sprocket wheels and inherently travel in straight lines between the sprockets. Therefore, this type of machine inherently requires an elongated footprint on a factory floor, which may or may not be available. Also, some associated production equipment has work stations arranged in a circular or another pattern, which heretofore has required a manual transfer of product from such equipment to an input product conveyor 38.

The problem addressed by the invention is to provide a conveyor which may curve and follow almost any path. By way of example, FIG. 2 shows a hypothetical packaging system having a merry-go-round type of loader 40 where product is loaded into cups 42 for volume measurement. The measured volume of product is deposited onto a conveyor 44 at work stations 46, 48, 50; therefore, it is necessary for the conveyor 44 to curve around the merry-go-round 40. It is further assumed that, for some reason, the conveyor 44 must curve off in an opposite direction at 52 in order to reach another work station 54. Then, the conveyor 44 delivers product from work stations 54, 46, 48, 50 to work station 56 where it is deposited in mandrels 22 on conveyor 20. Accordingly, it is necessary to synchronize conveyor 44 with the merry-go-round 40, work stations 46–56, and conveyors 20 and 25.

In general, a link chain conveyor may be mounted horizontally (FIG. 3) to carry vertically oriented mandrels or other parts; or, the link chain conveyor may be mounted vertically (FIG. 4) to carry horizontally oriented mandrels or other parts.

To illustrate a horizontally oriented conveyor, with vertically oriented parts, FIG. 3 shows a conveyor 60 having two link chains 62, 64, which are trained around horizontally oriented sprocket wheels (not shown) mounted on axle 66, and another axle (not visible) on an opposite end of the conveyor. The spaced parallel plates 68, 70 provide mechanical support for the link chain conveyor and sprockets. Bolted to link chains 62, 64 are members 72 which, in this example, are means for gripping and loading bottles 74 into boxes 76. In the background, another conveyor (now shown) carries the boxes 76. The point is that the link chains 62, 64 may be used while in a horizontal position in order to carry any suitable parts in a vertical orientation.

Figure 4:
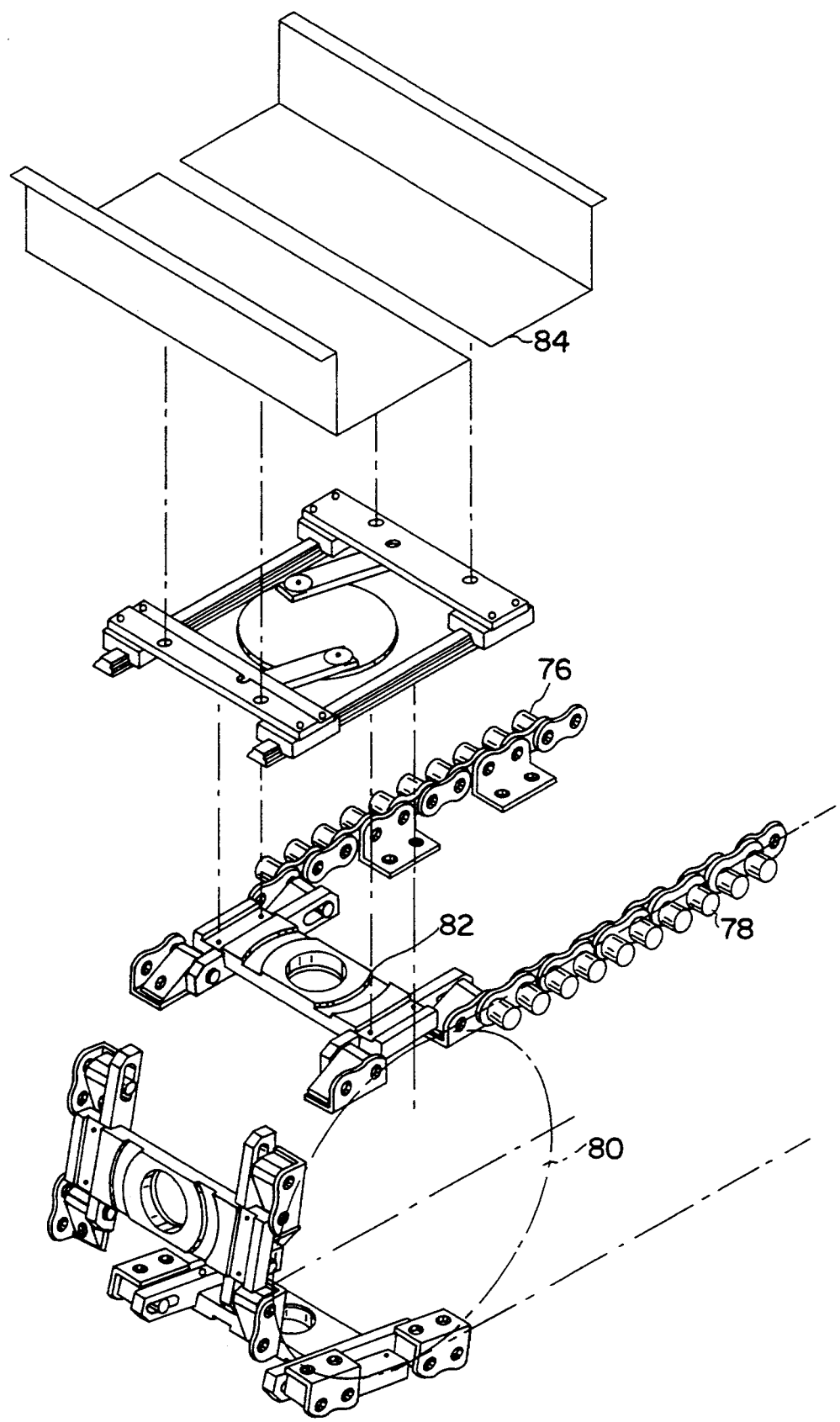
FIG. 4 is a similar and exploded view in perspective of a conventional packaging machine conveyor having horizontally oriented modules bolted to vertical conveyor chains.

FIG. 4 shows two link chains 76, 78 which are trained around vertical sprocket wheels, one of which is shown at 80. A suitable member 82 extends horizontally between and is bolted to these vertically oriented chains 76, 78 in order to carry a mandrel tray 84. The point of this FIG. 4 disclosure is that the link chains 76, 78 may be used while in a vertical position.

Accordingly, if it is to be compatible with existing automatic packaging machines and to use their parts, it is necessary for any new form of a link chain to be usable in both the horizontal and vertical positions. Moreover, the members 72, 82 are cited as examples which represent many different forms of existing modules. Any new link chain should be adapted to receive any of these and similar existing modules and to fit into existing machine designs.

Figure 5:
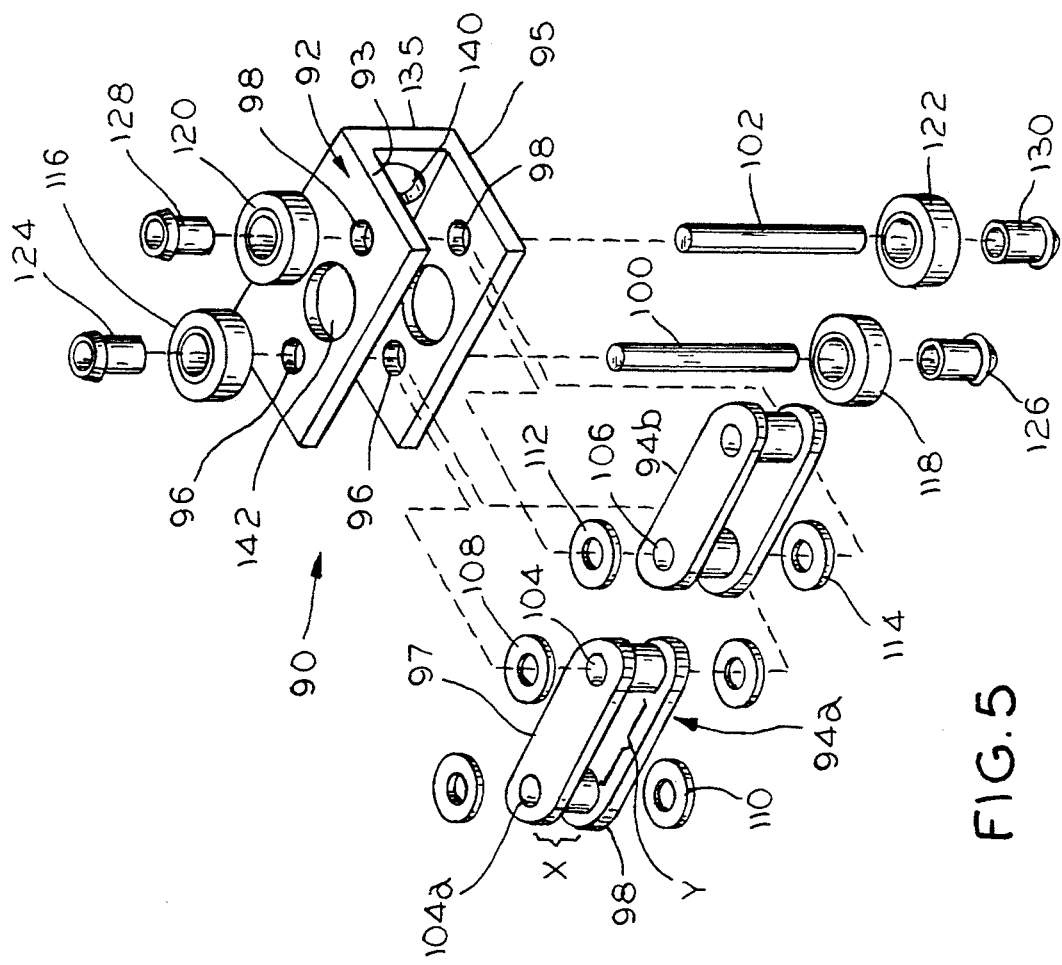
FIG. 5 is an exploded perspective view of the inventive roller guided, link chain.

The inventive roller link chain 90 (FIGS. 4, 5) includes a U-shaped bracket 92 pivotally joined to links 94 which are conventional components regularly used in link chains. The teeth of a sprocket wheel fit into the space X, Y (FIG. 5) between the upper and lower plates 97, 99 and between bearing posts 101, 103 on opposite ends of the link 94. The U-shaped bracket 92 has two pairs of aligned holes 96, 98 extending through the spaced parallel plates 93, 95 which form the opposing arms of the U-shape. Two axles or shafts 100, 102 pass through these holes 96, 98. The shaft 100 also passes through bearing 104 in the link 94a which fits between the spaced parallel plates 93, 95. The shaft 102 also passes through bearing 106 in the link 94b which also fits between plates 93, 95. Therefore, the links 94a, 94b are to swing back and forth on the shafts 100, 102, which act as hinge pins. Suitable washers 108–114 are threaded over the shafts 100, 102 and are positioned on opposite sides of the links 94a, 94b, respectively, in order to reduce friction between the plates 93, 95 and links 94a, 94b, as they swing back and forth when the chain flexes.

Suitable rollers 116–122 are fitted over opposite ends of shafts 100, 102, respectively. They are held in place on the shaft by end caps 124, 126, 128, 130, respectively.

Figure 6:
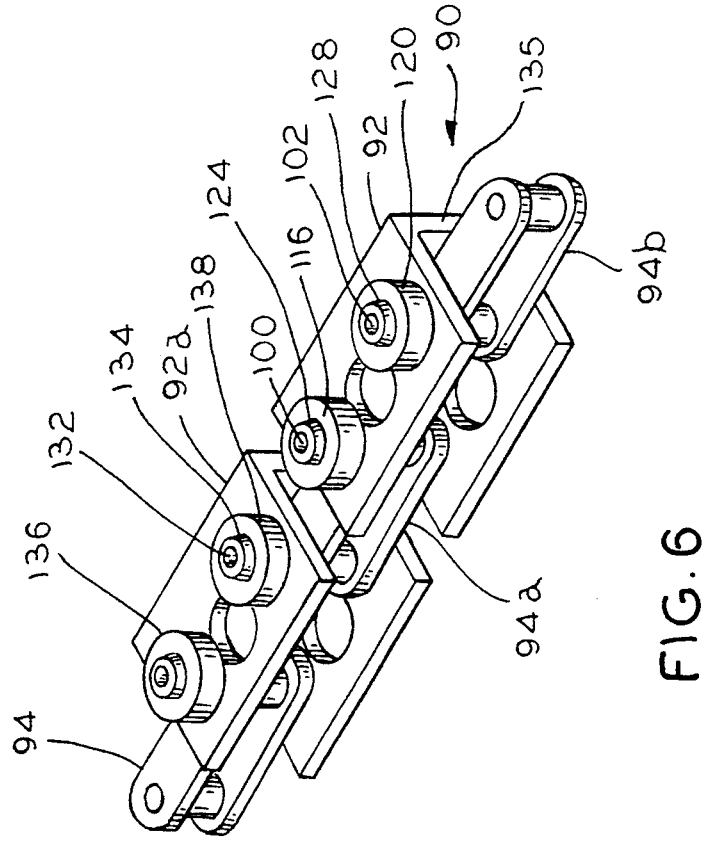
FIG. 6 is an assembled view of the roller guided, link chain of FIG. 5.

The opposite end 104a (FIG. 5) of link 94a is held in place within U-shaped bracket 92a (FIG. 6) by a shaft 132 and its end cap 134, which is essentially the same as shaft 102, and its end cap 134. Rollers 136, 138 are mounted on the bracket 92a in the same manner that rollers 116, 120 are mounted on the bracket 92. Thus, it should now be apparent that the entire length of the inventive roller link chain may be guided and directed by the rollers 136, 134, 116, 120.

The bottom of the U-shape of bracket 92 (FIG. 5) is formed by plate 135 which includes a number of holes 140, 142 that have a standard and conventional link chain spacing so that conventional equipment (such as that shown in FIGS. 3, 4) may be bolted thereto.

FIG. 7 is an exploded view, in perspective, of a track which may carry, guide, and direct the roller link chain. Each of top and bottom track sections 150, 152 has a groove 154, 156 formed therein for confining and directing the roller, link chain along a path defined by the groove. The upper and lower rollers 116, 118, 122 roll in these grooves. Bolted to the U-shaped link chain bracket 92 is a suitable device 160 which might be the module 72 of FIG. 3 or a similar device, for example.

FIG. 7 shows the track 150, 152 in a horizontal orientation, which is similar to the showing of FIG. 3. However, it should also be apparent that the track sections may also be mounted vertically to orient the link chain in a manner similar to the showing of FIG. 4.

The tracks 150, 152 are made in sections so that they may be assembled in a manner which is somewhat similar to the way that a model railroad track may be assembled. FIG. 7 shows upper and lower curved track section 150, 152 and upper and lower straight track section 162, 164. Any suitable track section may also be formed for use in connection with these or similar curved sections.

These track sections may be made in any suitable manner. For example, each track section may be as simple as a piece of steel with a groove milled in it. Depending upon the mechanical forces, the track sections might also be molded from a heat resistant plastic. Any suitable end connectors may be provided to join the track sections.

Those who are skilled in the art will readily perceive how to modify the invention. Therefore, the appended claims are to be construed to cover all equivalent structures which fall within the true scope and spirit of the invention.

The claimed invention is:

1. A link chain conveyor for an automatic packaging machine comprising first chain links having upper and lower spaced parallel plates of conventional configuration with bearing posts extending between and in contact with opposite ends of said plates for defining between them a space to receive a tooth on a sprocket wheel, second chain links fitting into space occupied by links having a conventional configuration, said second links being formed of a U-shaped bracket having spaced parallel plates formed by opposite arms of said U-shape, a space between the parallel plates fitting and receiving said first chain links, a pair of shafts passing through opposite ends of said spaced parallel plates of said second links and through said bearing posts of said first links, four rollers associated with said U-shaped bracket of said second chain links, each of said rollers being mounted on and individually associated with an end of said pair of shafts, equipment mounting means on at least one of said parallel plates of said U-shaped bracket, said mounting means conforming to and being compatible with mounting means on conventional automatic packaging machine link chain conveyors in order to carry standard automatic packaging equipment of a type usually mounted on said conventional link chain, and means defining a conveyor path of any suitable closed configuration through an automatic packaging machine for receiving and confining said rollers for causing said link chain conveyor to travel along said defined path.

2. The link chain of claim 1 and means for mounting and using said path defining means in either a horizontal or a vertical position.

3. The conveyor of claim 1 wherein said path defining means is a track having a groove in which said rollers may travel, said track including a plurality of standardized sections of different configurations so that a track may be assembled to fit different localized floor space need.

4. The conveyor of claim 3 wherein said groove fits said roller in either a horizontal or a vertical orientation.

* * * * *